US012785199B2

(12) United States Patent
Fukuda

(10) Patent No.: US 12,785,199 B2
(45) Date of Patent: Nov. 3, 2026

(54) BATTERY PACK

(71) Applicant: PRIME PLANET ENERGY & SOLUTIONS, INC., Tokyo (JP)

(72) Inventor: Masaki Fukuda, Kasai (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 750 days.

(21) Appl. No.: 18/152,327

(22) Filed: Jan. 10, 2023

(65) Prior Publication Data

US 2023/0238639 A1 Jul. 27, 2023

(30) Foreign Application Priority Data

Jan. 24, 2022 (JP) ................................ 2022-008726

(51) Int. Cl.
*H01M 50/293* (2021.01)
*H01M 10/653* (2014.01)
*H01M 50/209* (2021.01)

(52) U.S. Cl.
CPC ....... *H01M 50/293* (2021.01); *H01M 10/653* (2015.04); *H01M 50/209* (2021.01)

(58) Field of Classification Search
CPC ............. H01M 50/204; H01M 50/209; H01M 50/293; H01M 10/653
See application file for complete search history.

(56) References Cited

U.S. PATENT DOCUMENTS

| | | | | |
|---|---|---|---|---|
| 11,005,131 B2 | 5/2021 | Zhou et al. | | |
| 2012/0177960 A1 | 7/2012 | Tasai et al. | | |
| 2013/0004822 A1 | 1/2013 | Hashimoto et al. | | |
| 2014/0363709 A1 | 12/2014 | Tasai et al. | | |
| 2015/0188203 A1 | 7/2015 | Enomoto et al. | | |
| 2017/0040652 A1 | 2/2017 | Tasai et al. | | |
| 2017/0125756 A1 | 5/2017 | Nietling et al. | | |
| 2019/0058228 A1 | 2/2019 | Tasai et al. | | |
| 2020/0212391 A1 | 7/2020 | Chen et al. | | |
| 2021/0249646 A1 | 8/2021 | Inoue et al. | | |
| 2022/0093986 A1* | 3/2022 | Ahn | .................... | H01M 10/613 |
| 2022/0278384 A1 | 9/2022 | Takahashi | | |
| 2023/0112676 A1* | 4/2023 | Park | .................... | H01M 10/613 429/163 |

FOREIGN PATENT DOCUMENTS

| | | | |
|---|---|---|---|
| CN | 111384337 | A | 7/2020 |
| CN | 211428239 | U | 9/2020 |
| CN | 113228387 | A | 8/2021 |
| CN | 113258034 | A | 8/2021 |
| CN | 113853708 | A | 12/2021 |
| EP | 2541668 | A1 | 1/2013 |

(Continued)

*Primary Examiner* — Nicholas A Smith
(74) *Attorney, Agent, or Firm* — Finnegan, Henderson, Farabow, Garrett, and Dunner, LLP

(57) ABSTRACT

A battery pack includes: a plurality of stacked battery cells; a holding member that holds the plurality of battery cells; an adhesive member that is interposed between each of the battery cells and the holding member and that adheres each of the battery cells and the holding member; and a heat conduction member that has an elastic modulus smaller than an elastic modulus of the adhesive member and that is interposed between each of the battery cells and the holding member.

5 Claims, 5 Drawing Sheets

(56) References Cited

FOREIGN PATENT DOCUMENTS

| | | | | | |
|---|---|---|---|---|---|
| EP | 3 916 832 | A1 | | 12/2021 | |
| JP | 2013-012441 | A | | 1/2013 | |
| JP | 2014-060088 | A | | 4/2014 | |
| JP | 2016-015328 | A | | 1/2016 | |
| JP | 2017-123212 | A | | 7/2017 | |
| KR | 10-2021-0094924 | A | | 7/2021 | |
| WO | WO 2021/024772 | A1 | | 2/2021 | |
| WO | WO-2021149903 | A1 | * | 7/2021 | .......... H01M 50/211 |

* cited by examiner

BATTERY PACK

This nonprovisional application is based on Japanese Patent Application No. 2022-008726 filed on Jan. 24, 2022 with the Japan Patent Office, the entire contents of which are hereby incorporated by reference.

BACKGROUND OF THE INVENTION

Field of the Invention

The present invention relates to a battery pack.

Description of the Background Art

For example, U.S. patent Ser. No. 11/005,131 discloses a battery box including: a housing; a plurality of cells accommodated in the housing; and a heat conductive structural adhesive agent provided between a bottom portion of the housing and each of the plurality of cells.

Further, Japanese Patent Laying-Open No. 2016-15328 discloses a power storage device including a case; a power generation element disposed in the case; a cooling member that is disposed on a lower surface of the case and that forms a flow path through which coolant flows; and a heat conduction member that is disposed between the cooling member and the case and that is composed of a material having a heat conductivity higher than that of air.

Further, Japanese Patent Laying-Open No. 2014-60088 discloses a secondary battery device including: an outer case having a battery accommodation chamber; battery cells accommodated in the battery accommodation chamber; and an adhesive agent that adheres and fixes the battery cells to an inner surface of the outer case.

SUMMARY OF THE INVENTION

As disclosed in the above-described pieces of patent literature, there has been known a battery pack including a plurality of battery cells; and a holding member, such as a case body, that holds the plurality of battery cells. In such a battery pack, it is required to achieve both secure fixation of the battery cells to the holding member and efficient cooling of the battery cells that each emit heat.

Thus, it is an object of the present invention to solve the above-described problems and to provide a battery pack to achieve both secure fixation of battery cells and efficient cooling of the battery cells.

A battery pack according to the present invention includes, a plurality of stacked battery cells; a holding member that holds the plurality of battery cells; an adhesive member that is interposed between each of the battery cells and the holding member and that adheres each of the battery cells and the holding member, and a heat conduction member that has an elastic modulus smaller than an elastic modulus of the adhesive member and that is interposed between each of the battery cells and the holding member.

According to the battery pack thus configured, each of the battery cells can be securely fixed to the holding member by the adhesive member. Further, since the heat conduction member having an elastic modulus smaller than that of the adhesive member is more likely to be deformed than the adhesive member, the heat conduction member can be readily deformed according to the deformation of the battery cell. Thus, heat generated in the battery cells can be efficiently conducted to the holding member through the heat conduction member, thereby efficiently cooling the battery cells.

Preferably, a heat conductivity of the heat conduction member is more than a heat conductivity of the adhesive member.

According to the battery pack thus configured, heat from the battery cells can be more efficiently conducted to the holding member through the heat conduction member.

Preferably, each of the battery cells includes a bottom surface having a rectangular shape with a short side extending in a stacking direction of the battery cells and a long side extending in a direction orthogonal to the stacking direction of the battery cells. The adhesive member is disposed at each of both end portions of the bottom surface in the direction orthogonal to the stacking direction of the battery cells. The heat conduction member is disposed at a central portion of the bottom surface in the direction orthogonal to the stacking direction of the battery cells.

According to the battery pack thus configured, the adhesive member that is less likely to be deformed is disposed at each of the both end portions of the bottom surface that each have a relatively small amount of deformation when the battery cell is deformed, and the heat conduction member that is likely to be deformed is disposed at the central portion of the bottom surface that has a relatively large amount of deformation when the battery cell is deformed. Thus, the battery cells can be more efficiently cooled while fixing the battery cells to the holding member more securely.

Preferably, each of the battery cells has a bottom surface and a side surface that rises from the bottom surface and that has an area smaller than an area of the bottom surface. The adhesive member is disposed on the side surface. The heat conduction member is disposed on the bottom surface.

According to the battery pack thus configured, the adhesive member that is less likely to be deformed is disposed on the side surface having a relatively small amount of deformation when the battery cell is deformed, and the heat conduction member that is likely to be deformed is disposed on the bottom surface having a relatively large amount of deformation when the battery cell is deformed. Thus, the battery cells can be more efficiently cooled while fixing the battery cells to the holding member more securely.

Preferably, a contact area of the heat conduction member with the battery cells is larger than a contact area of the adhesive member with the battery cells.

According to the battery pack thus configured, heat from the battery cells can be more efficiently conducted to the holding member through the heat conduction member.

Preferably, each of the battery cells has a thin plate shape having a thickness direction corresponding to a stacking direction of the battery cells. When viewed in the stacking direction of the battery cells, the heat conduction member is disposed symmetrically on both sides with respect to a center line of each of the battery cells, the center line extending in an upward/downward direction.

According to the battery pack thus configured, each of the battery cells can be cooled in a well-balanced manner on both sides with respect to the center line.

Preferably, the plurality of battery cells form a cell stack. The holding member has a facing surface facing the cell stack. The adhesive member is provided in a form of a frame along a peripheral edge of the facing surface. The heat conduction member is composed of a heat conduction material having fluidity, and is provided in a central region of the facing surface surrounded by the adhesive member.

According to the battery pack thus configured, a mechanism that keeps the heat conduction member having fluidity at the facing surface can be constructed in a simplified manner.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
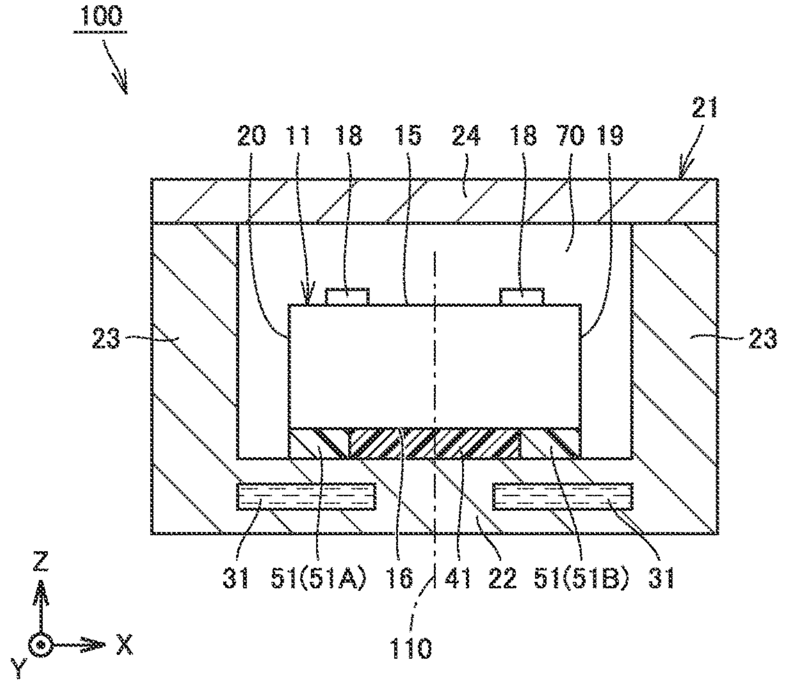
FIG. 1 is a cross sectional view showing a battery pack according to an embodiment of the present invention.

Embodiments of the present invention will be described with reference to figures. It should be noted that in the figures referred to below, the same or corresponding members are denoted by the same reference characters.

Figure 2:
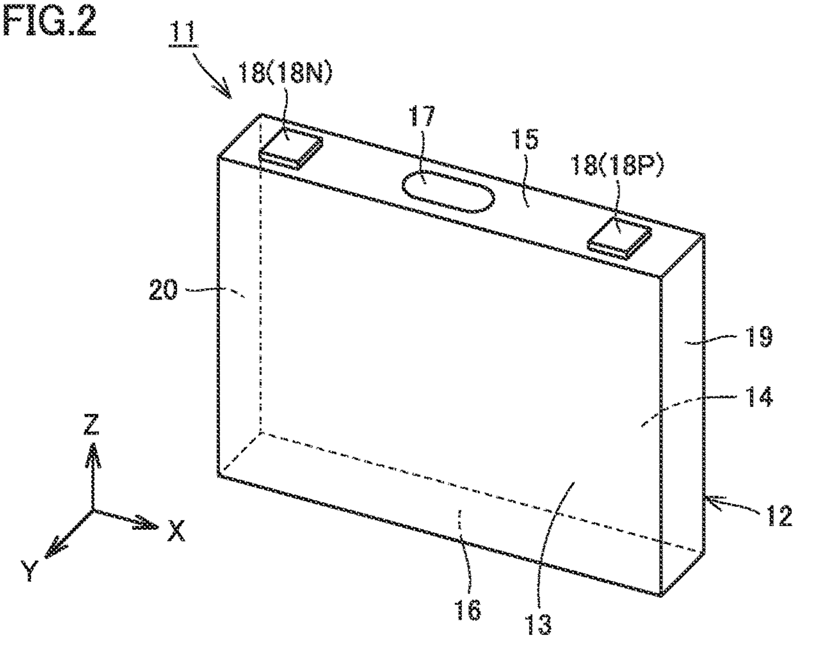
FIG. 2 is a perspective view showing a battery cell included in the battery pack in FIG. 1.
Figure 3:
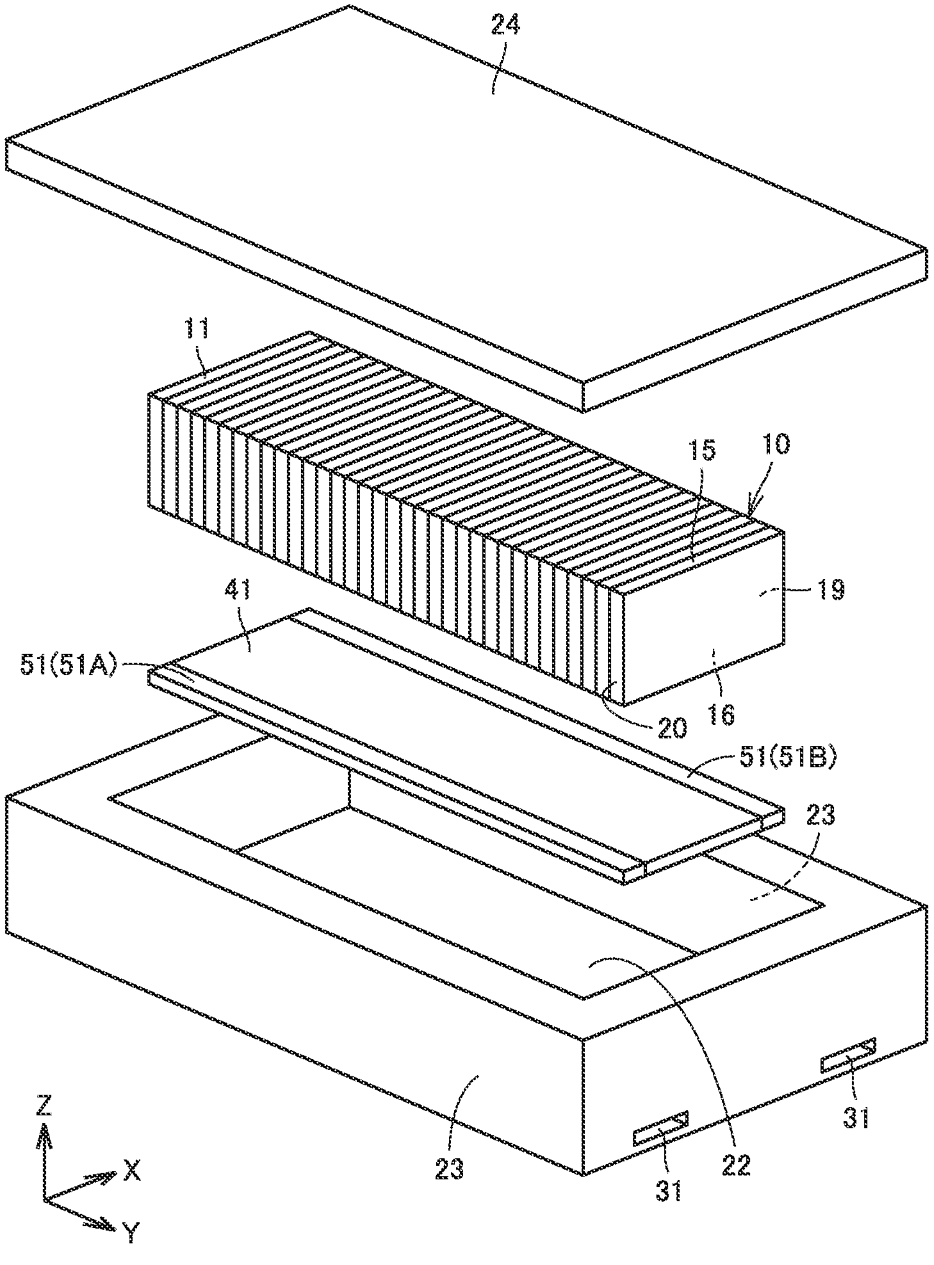
FIG. 3 is an exploded assembly diagram showing the battery pack in FIG. 1.

FIG. 1 is a cross sectional view showing a battery pack according to an embodiment of the present invention. FIG. 2 is a perspective view showing a battery cell included in the battery pack in FIG. 1. FIG. 3 is an exploded assembly diagram showing the battery pack in FIG. 1.

Referring to FIGS. 1 to 3, a battery pack 100 is used as a power supply for driving a vehicle such as a hybrid electric vehicle (HEV), a plug-in hybrid electric vehicle (PHEV), or a battery electric vehicle (BEV).

In the present specification, for convenience of explanation of a structure of a battery pack 100, a "Y axis" represents an axis extending in a stacking direction of a plurality of below-described battery cells 11 and in a horizontal direction, an "X axis" represents an axis extending in a direction orthogonal to the Y axis and in the horizontal direction, and a "Z axis" represents an axis extending in an upward/downward direction.

Battery pack 100 has a plurality of battery cells 11 and a case body 21. The plurality of battery cells 11 are stacked in the Y axis direction. Case body 21 holds the plurality of battery cells 11. Case body 21 holds the plurality of battery cells 11 in a space 70 described later. In the present embodiment, case body 21 corresponds to a "holding member" in the present invention.

As shown in FIG. 2, battery cell 11 is a lithium ion battery. Battery cell 11 has a prismatic shape and has a thin plate shape in the form of a rectangular parallelepiped. The plurality of battery cells 11 are stacked such that the Y axis direction corresponds to the thickness direction of each battery cell 11.

Each of battery cells 11 has an exterior package 12. Exterior package 12 is constituted of a housing having a rectangular parallelepiped shape, and forms an external appearance of battery cell 11. An electrode assembly and an electrolyte solution are accommodated in exterior package 12.

Exterior package 12 has a first side surface 13, a second side surface 14, a third side surface 19, a fourth side surface 20, a top surface 15, and a bottom surface 16. Each of first side surface 13 and second side surface 14 is constituted of a flat surface orthogonal to the Y axis. First side surface 13 and second side surface 14 are oriented oppositely in the Y axis direction. Each of first side surface 13 and second side surface 14 has the largest area among the areas of the plurality of side surfaces of exterior package 12.

Each of third side surface 19 and fourth side surface 20 is constituted of a flat surface orthogonal to the X axis. Third side surface 19 and fourth side surface 20 are oriented oppositely in the X axis direction. Each of third side surface 19 and fourth side surface 20 has an area smaller than the area of bottom surface 16. Each of third side surface 19 and fourth side surface 20 has the smallest area among the areas of the plurality of side surfaces of exterior package 12.

Each of top surface 15 and bottom surface 16 is constituted of a flat surface orthogonal to the Z axis. Top surface 15 is oriented upward. Bottom surface 16 is oriented downward. Top surface 15 is provided with a gas-discharge valve 17 for discharging gas generated in exterior package 12 to outside of exterior package 12 when internal pressure of exterior package 12 becomes equal to or more than a predetermined value due to the gas.

Each of first side surface 13, second side surface 14, third side surface 19, fourth side surface 20, top surface 15, and bottom surface 16 has a rectangular shape. Each of first side surface 13 and second side surface 14 has a rectangular shape in which the X axis direction corresponds to the long side direction and the Z axis direction corresponds to the short side direction. Each of third side surface 19 and fourth side surface 20 has a rectangular shape in which the Z axis direction corresponds to the long side direction and the Y axis direction corresponds to the short side direction. Each of top surface 15 and bottom surface 16 has a rectangular shape in which the X axis direction corresponds to the long side direction and the Y axis direction corresponds to the short side direction.

Battery cell 11 further has electrode terminals 18 including a pair of a positive electrode terminal 18P and a negative electrode terminal 18N. Electrode terminal 18 is provided on top surface 15. Positive electrode terminal 18P and negative electrode terminal 18N are provided to be separated from each other in the X axis direction. Positive electrode terminal 18P and negative electrode terminal 18N are provided on both sides beside gas-discharge valve 17 in the X axis direction.

The plurality of battery cells 11 are stacked such that first side surfaces 13 of battery cells 11, 11 adjacent to each other in the Y axis direction face each other and second side surfaces 14 of battery cells 11, 11 adjacent to each other in the Y axis direction face each other. Thus, positive electrode terminals 18P and negative electrode terminals 18N are alternately arranged in the Y axis direction in which the plurality of battery cells 11 are stacked.

Between battery cells 11, 11 adjacent to each other in the Y axis direction, positive electrode terminal 18P and negative electrode terminal 18N arranged side by side in the Y axis direction are connected to each other by a bus bar (not shown). The plurality of battery cells 11 are electrically connected to one another in series.

The plurality of battery cells 11 stacked in the Y axis direction form a cell stack 10. Cell stack 10 has a rectangular parallelepiped shape. The length of cell stack 10 in the Y axis direction is larger than the length of cell stack 10 in the Z axis direction and is larger than the length of cell stack 10 in the X axis direction.

Case body 21 is constituted of a box body having an external appearance with a rectangular parallelepiped shape. The length of case body 21 in the Y axis direction is larger than the length of case body 21 in the Z axis direction and is larger than the length of case body 21 in the X axis direction. Case body 21 has a case bottom portion 22, case side portions 23, and a case top portion 24.

Case bottom portion 22 is disposed at the bottom of case body 21. Case bottom portion 22 is composed of a plate material that has a thickness direction corresponding to the Z axis direction and that extends in the horizontal direction. Case bottom portion 22 is provided with a coolant path 31 through which coolant flows. Coolant path 31 extends in the Y axis direction. Each of case side portions 23 rises upward from a peripheral edge of case bottom portion 22. Space 70 is defined at a position located above case bottom portion 22 and surrounded by case side portions 23 so as to be open upward and accommodate the plurality of battery cells 11 (cell stack 10). The plurality of battery cells 11 are restrained by case side portions 23 at both ends in the Y axis direction. Each of case side portions 23 exerts restraint force (compressive force) onto the plurality of battery cells 11 in the Y axis direction.

Case top portion 24 is disposed to face case bottom portion 22 in the Z axis direction. Case top portion 24 is detachably attached to upper end portions of case side portions 23 and serves as a cover body to close the opening of space 70.

It should be noted that coolant path 31 for supplying the coolant is not limited to being provided in case bottom portion 22, but may be provided, for example, in a member different from case body 21 and connected to case bottom portion 22.

Figure 4:
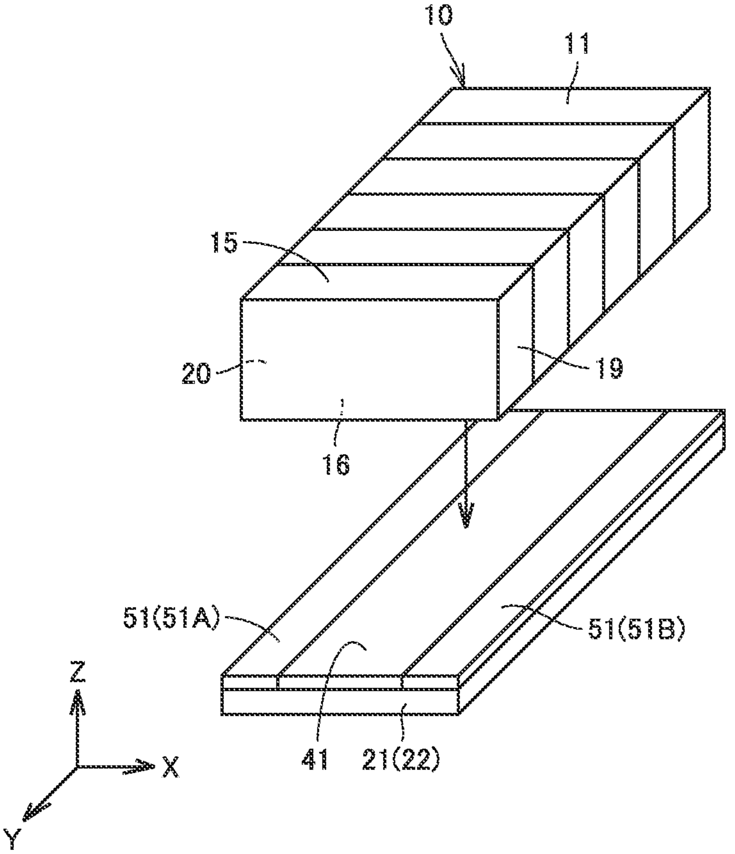
FIG. 4 is a perspective view schematically showing a process of assembling the battery pack in FIG. 1.

FIG. 4 is a perspective view schematically showing a process of assembling the battery pack in FIG. 1. Each of FIG. 4 and FIGS. 8 and 9 described later shows only case bottom portion 22 of case body 21. Referring to FIGS. 1 to 4, battery pack 100 further includes a heat conduction member 41 and adhesive members 51 (51A, 51B).

Heat conduction member 41 is composed of a material different from a material of each of adhesive members 51. The elastic modulus of heat conduction member 41 is smaller than the elastic modulus of adhesive member 51. The heat conductivity of heat conduction member 41 is more than the heat conductivity of adhesive member 51. Heat conduction member 41 may be composed of a material (adhesive agent) having adhesiveness or may be composed of a material having no adhesiveness.

Heat conduction member 41 may be a heat-conduction sheet, heat-conduction grease, gap filler or heat-conduction gel. Heat conduction member 41 is composed of a material such as acrylic, urethane, silicone, or modified silicone. Adhesive member 51 is composed of a material such as epoxy, acrylic, urethane, silicone, or cyanoacrylate.

Adhesive member 51 is interposed between each of battery cells 11 and case body 21. Adhesive member 51 is interposed between each of the plurality of battery cells 11 (cell stack 10) and case body 21. Adhesive member 51 adheres each of battery cells 11 and case body 21. The plurality of battery cells 11 (cell stack 10) are fixed to case body 21 by adhesive member 51.

Heat conduction member 41 is interposed between each of battery cells 11 and case body 21. Heat conduction member 41 is interposed between each of the plurality of battery cells 11 (cell stack 10) and case body 21.

Adhesive member 51 is interposed between bottom surface 16 of each of battery cells 11 and case bottom portion 22 of case body 21. Heat conduction member 41 is interposed between bottom surface 16 of each of battery cells 11 and case bottom portion 22 of case body 21. Adhesive members 51 are disposed at both end portions of bottom surface 16 in the X axis direction. Heat conduction member 41 is disposed at a central portion of bottom surface 16 in the X axis direction.

Heat conduction member 41 extends in the form of a strip on case bottom portion 22 in the Y axis direction. Each of adhesive members 51A and 51B extends in the form of a strip on case bottom portion 22 in the Y axis direction. Heat conduction member 41 is disposed between adhesive members 51A and 51B in the X axis direction. Heat conduction member 41 is provided at a position overlapping with gas-discharge valve 17 when viewed in the Z axis direction. When viewed in the Z axis direction, adhesive members 51A and 51B are provided at positions displaced from gas-discharge valve 17 toward the both sides in X axis direction.

Heat conduction member 41 and each of adhesive members 51 are provided to cover a whole of bottom surface 16. The contact area of heat conduction member 41 with battery cells 11 is larger than the contact area of adhesive member 51 with battery cells 11. The contact area of heat conduction member 41 with battery cells 11 may be less than or equal to the contact area of adhesive member 51 with battery cell 11.

FIG. 1 shows a center line 110 of battery cell 11 when battery pack 100 is viewed in the Y axis direction, center line 110 extending in the Z axis direction (upward/downward direction). Battery cell 11 (exterior package 12) has a shape symmetrical with respect to center line 110. Positive electrode terminal 18P is disposed on one side in the X axis direction with respect to center line 110, and negative electrode terminal 18N is disposed on the other side in the X axis direction with respect to center line 110. A length between center line 110 and positive electrode terminal 18P in the X axis direction is equal to a length between center line 110 and negative electrode terminal 18N in the X axis direction. Heat conduction member 41 is disposed symmetrically on both sides with respect to center line 110. Heat conduction member 41 has such a shape that when folded in a Y-Z axes plane including center line 110, folded portions of heat conduction member 41 completely overlap with each other. Adhesive members 51 (51A, 51B) are disposed symmetrically on both sides with respect to center line 110.

Figure 5:
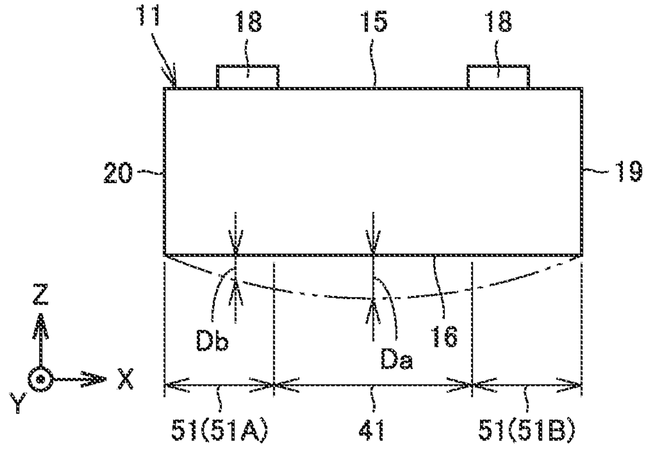
FIG. 5 is a diagram schematically showing a manner of deformation of a battery cell (bottom surface).

FIG. 5 is a diagram schematically showing a manner of deformation of a battery cell (bottom surface). Referring to FIG. 5, battery cell 11 (exterior package 12) is deformed (expanded) in response to charging/discharging thereof. When paying attention to deformation of bottom surface 16 on this occasion, an amount of deformation of bottom surface 16 in the Z axis direction is relatively large at the central portion of bottom surface 16 in the X axis direction and is relatively small at the both end portions of bottom surface 16 in the X axis direction (Da>Db). This is due to the following reason: exterior package 12 having an external appearance with a rectangular parallelepiped shape is less likely to be deformed at a position along an end side of exterior package 12, and the amount of deformation becomes larger in a direction further away from the end side.

Referring to FIGS. 1 to 5, in the present embodiment, battery cells 11 can be securely fixed to case body 21 by adhesive members 51 (51A, 51B) interposed between each of battery cells 11 and case body 21.

Further, since heat conduction member 41 having an elastic modulus smaller than that of each of adhesive members 51 is more likely to be deformed than adhesive member 51, heat conduction member 41 can be readily deformed according to the deformation of battery cell 11. Thus, a void serving as a heat insulating layer can be suppressed from being formed between heat conduction member 41 and battery cell 11 due to the deformation of battery cell 11. As a result, heat generated in battery cell 11 can be efficiently conducted to case bottom portion 22 of case body 21 provided with coolant path 31 through heat conduction member 41, thereby efficiently cooling battery cells 11 that each emit heat.

In particular, in the present embodiment, adhesive members 51 (51A, 51B) that are less likely to be deformed are disposed at the both end portions of bottom surface 16 that each have a relatively small amount of deformation, and heat conduction member 41 that is likely to be deformed is disposed at the central portion of bottom surface 16 that has a relatively large amount of deformation. With such a configuration, voids can be suppressed from being formed between adhesive member 51 and battery cell 11 and between heat conduction member 41 and battery cell 11 due to the deformation of battery cell 11. In addition, the heat conductivity of heat conduction member 41 is more than the heat conductivity of adhesive member 51. Therefore, battery cells 11 can be cooled more efficiently while fixing battery cells 11 to case body 21 more securely.

Further, since the contact area of heat conduction member 41 with battery cells 11 is larger than the contact area of adhesive member 51 with battery cells 11, conduction of heat from battery cell 11 to case body 21 can be promoted. Further, since heat conduction member 41 is disposed symmetrically with respect to center line 110 of battery cell 11, battery cells 11 can be cooled in a well-balanced manner on both sides with respect to center line 110.

Figure 6:
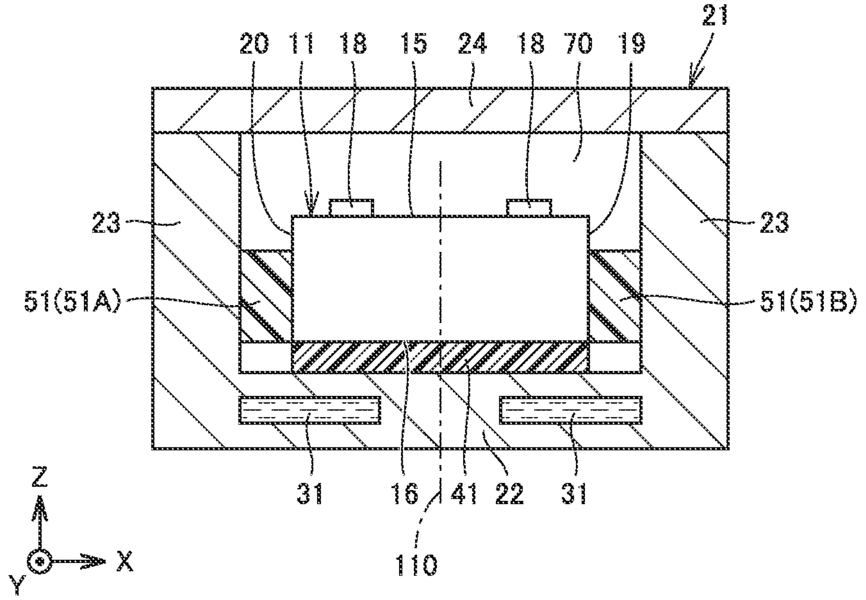
FIG. 6 is a cross sectional view showing a first modification of the battery pack in FIG. 1.
Figure 7:
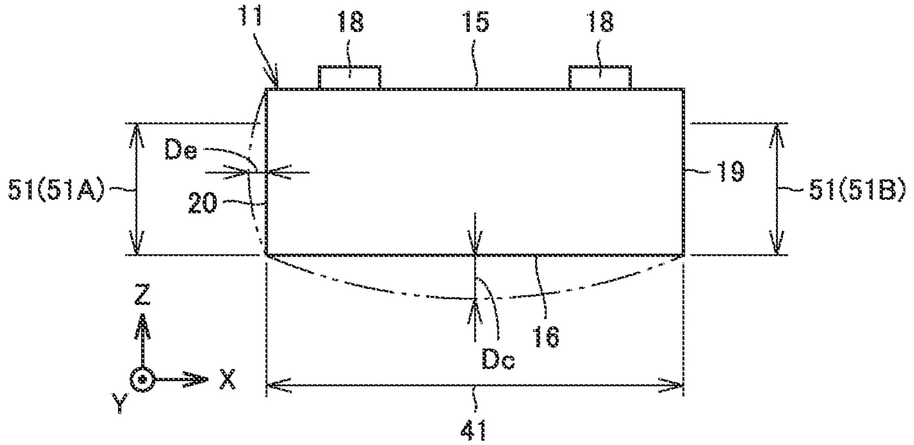
FIG. 7 is a diagram schematically showing a manner of deformation of a battery cell (bottom surface and fourth side surface).

FIG. 6 is a cross sectional view showing a first modification of the battery pack in FIG. 1. FIG. 6 shows a cross section of the battery pack corresponding to FIG. 1. FIG. 7 is a diagram schematically showing a manner of deformation of a battery cell (bottom surface and fourth side surface).

Referring to FIGS. 6 and 7, in the present modification, adhesive members 51 (51A, 51B) are interposed between third side surface 19 of battery cell 11 and case side portion 23 of case body 21 and between fourth side surface 20 of battery cell 11 and case side portion 23 of case body 21. Heat conduction member 41 is interposed between bottom surface 16 of battery cell 11 and case bottom portion 22 of case body 21.

Heat conduction member 41 extends in the form of a strip on case bottom portion 22 in the Y axis direction. Heat conduction member 41 is symmetrically disposed on both sides with respect to center line 110. Each of adhesive members 51A and 51B extends in the form of a strip in the Y axis direction on case side portion 23. Adhesive members 51 (51A, SIB) are disposed symmetrically on both sides with respect to center line 110.

As shown in FIG. 7, when paying attention to deformations of bottom surface 16 and fourth side surface 20 (the same as fourth side surface 20 applies to third side surface 19) during expansion of battery cell 11, an amount of deformation of bottom surface 16 in the Z axis direction is larger than an amount of deformation of fourth side surface 20 (third side surface 19) in the X axis direction (Dc>De). This is due to the following reason: bottom surface 16 has an area larger than that of each of third side surface 19 and fourth side surface 20 and is likely to be deformed.

In the present modification, adhesive members 51 (51A and 51B) that are less likely to be deformed are disposed on third side surface 19 and fourth side surface 20 that each have a relatively small amount of deformation, and heat conduction member 41 that is likely to be deformed is disposed on bottom surface 16 that has a relatively large amount of deformation.

Figure 8:
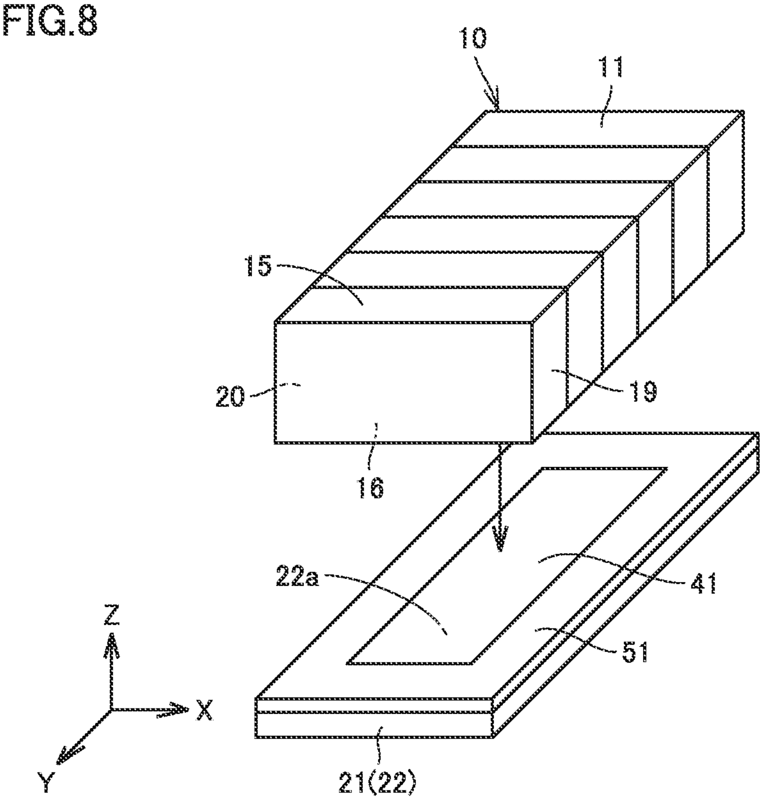
FIG. 8 is a perspective view showing a second modification of the battery pack in FIG. 1.

FIG. 8 is a perspective view showing a second modification of the battery pack in FIG. 1. FIG. 8 corresponds to FIG. 4. Referring to FIG. 8, case body 21 (case bottom portion 22) has a facing surface 22*a*. Facing surface 22*a* defines and forms space 70 and faces cell stack 10. Facing surface 22*a* has a rectangular shape in which the Y axis direction corresponds to the long side direction and the X axis direction corresponds to the short side direction.

In the present modification, adhesive member 51 is provided in the form of a frame along the peripheral edge of facing surface 22*a*. Adhesive member 51 is provided along an end side of facing surface 22*a* having a rectangular shape. Heat conduction member 41 is composed of a heat conduction material (such as heat-conduction grease or heat-conduction gel) having fluidity. Heat conduction member 41 is provided in a central region of facing surface 22*a* surrounded by adhesive member 51.

According to such a configuration, heat conduction member 41 is disposed on the inner side with respect to adhesive member 51 after adhesive member 51 is applied to facing surface 22*a* during assembling of the battery pack. Cell stack 10 is disposed on adhesive member 51 and heat conduction member 41, and adhesive member 51 is hardened. Thus, heat conduction member 41 composed of heat-conduction grease, heat-conduction gel, or the like can be kept at facing surface 22*a* by using adhesive member 51.

Figure 9:
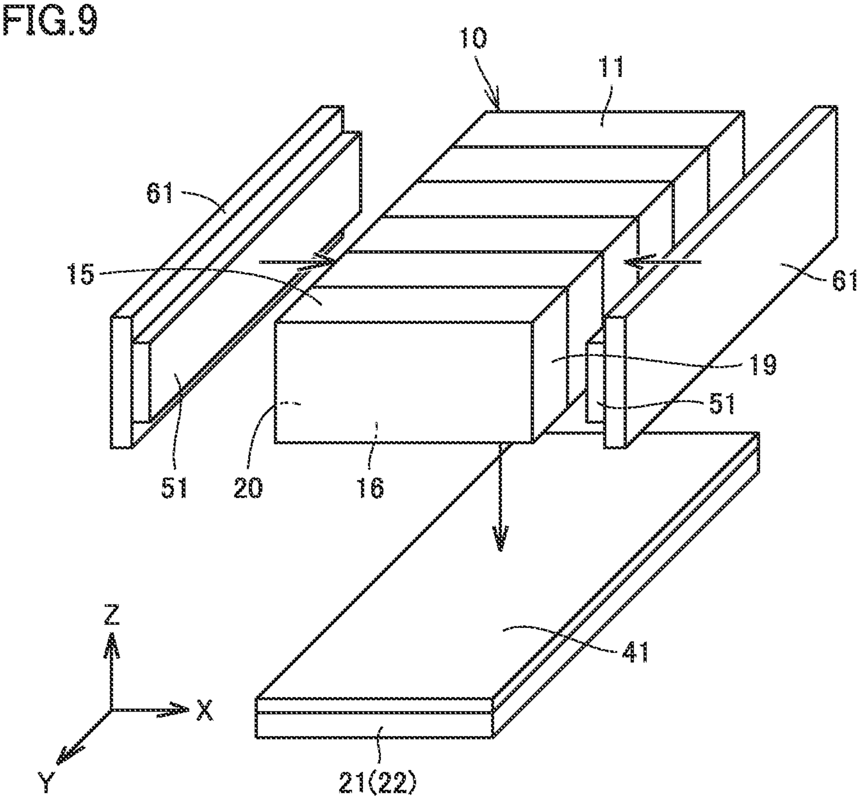
FIG. 9 is a perspective view showing a third modification of the battery pack in FIG. 1.

FIG. 9 is a perspective view showing a third modification of the battery pack in FIG. 1. FIG. 9 corresponds to FIG. 4. Referring to FIG. 9, the battery pack according to the present modification further has binding bars 61. Binding bars 61 extend in the Y axis direction. Binding bars 61 are provided at respective positions facing third side surface 19 and fourth side surface 20 of battery cell 11 in the X axis direction.

Adhesive members 51 are interposed between third side surface 19 of battery cell 11 and binding bar 61 and between fourth side surface 20 of battery cell 11 and binding bar 61. Binding bars 61 collectively hold the plurality of battery cells 11. Each of binding bars 61 is connected to case side portion 23 of case body 21. Heat conduction member 41 is interposed between bottom surface 16 of battery cell 11 and case bottom portion 22 of case body 21. In the present modification, case body 21 and binding bar 61 correspond to the holding member of the present invention.

Although the embodiments of the present invention have been described and illustrated in detail, it is clearly understood that the same is by way of illustration and example only and is not to be taken by way of limitation, the scope of the present invention being interpreted by the terms of the appended claims. The scope of the present invention is defined by the terms of the claims, and is intended to include any modifications within the scope and meaning equivalent to the terms of the claims.

What is claimed is:

1. A battery pack comprising:

a plurality of stacked battery cells;

a holding member that holds the plurality of battery cells;

an adhesive member that is interposed between each of the battery cells and the holding member and that adheres each of the battery cells and the holding member; and a heat conduction member that has an elastic modulus smaller than an elastic modulus of the adhesive member and that is interposed between each of the battery cells and the holding member, wherein each of the battery cells includes a bottom surface having a rectangular shape with a short side extending in a stacking direction of the battery cells and a long side extending in a direction orthogonal to the stacking direction of the battery cells, the adhesive member is only disposed at each of both end portions of the bottom surface in the direction orthogonal to the stacking direction of the battery cells, and the heat conduction member is only disposed at a central portion of the bottom surface in the direction orthogonal to the stacking direction of the battery cells.

2. The battery pack according to claim 1, wherein a heat conductivity of the heat conduction member is more than a heat conductivity of the adhesive member.

3. The battery pack according to claim 1, wherein a contact area of the heat conduction member with the battery cells is larger than a contact area of the adhesive member with the battery cells.

4. The battery pack according to claim 1, wherein each of the battery cells has a thin plate shape having a thickness direction corresponding to a stacking direction of the battery cells, and when viewed in the stacking direction of the battery cells, the heat conduction member is disposed symmetrically on both sides with respect to a center line of each of the battery cells, the center line extending in an upward/downward direction.

5. The battery pack according to claim 1, wherein the plurality of battery cells form a cell stack, the holding member has a facing surface facing the cell stack, the adhesive member is provided in a form of a frame along a peripheral edge of the facing surface, and the heat conduction member is composed of a heat conduction material having fluidity, and is provided in a central region of the facing surface surrounded by the adhesive member.

* * * * *